(12) United States Patent
Rosenblatt

(10) Patent No.: US 6,328,882 B1
(45) Date of Patent: Dec. 11, 2001

(54) RESIDENTIAL WASTE WATER RECYCLING SYSTEM

(76) Inventor: Joel Hl. Rosenblatt, Mile Marker 24.5, Royal Palm Plz., Summerland Key, FL (US) 33042

( * ) Notice: Subject to any disclaimer, the term of this patent is extended or adjusted under 35 U.S.C. 154(b) by 0 days.

(21) Appl. No.: 09/541,517

(22) Filed: Apr. 3, 2000

(51) Int. Cl.⁷ ....................................................... E03C 1/01
(52) U.S. Cl. ........................... 210/104; 210/86; 210/258; 210/257.1; 210/534; 4/661; 4/663; 4/665; 4/DIG. 10; 137/398
(58) Field of Search .................................. 210/90, 86, 85, 210/97, 104, 123, 153, 167, 136, 258, 257.1, 533, 534; 4/665, 663, 661, DIG. 10; 137/398, 571

(56) References Cited

U.S. PATENT DOCUMENTS

| | | |
|---|---|---|
| 1,232,929 | 7/1917 | Keller . |
| 2,860,348 * | 11/1958 | McClenahan . |
| 3,112,497 | 12/1963 | Call . |
| 3,188,656 | 6/1965 | Drager . |
| 3,318,449 | 5/1967 | Jennings et al. . |
| 3,543,294 | 11/1970 | Boester . |
| 3,815,159 * | 6/1974 | Delaney et al. . |
| 3,915,857 * | 10/1975 | Olson . |
| 4,162,218 | 7/1979 | McCormick . |
| 4,197,597 | 4/1980 | Toms . |
| 4,358,864 * | 11/1982 | Medrano . |
| 5,084,920 | 2/1992 | Kimball . |
| 5,104,525 * | 4/1992 | Roderick . |
| 5,243,719 | 9/1993 | McDonald et al. . |
| 5,251,346 | 10/1993 | Donati . |
| 5,274,861 | 1/1994 | Ford . |
| 5,317,766 | 6/1994 | McDonald et al. . |
| 5,345,625 | 9/1994 | Diemand . |
| 5,406,657 | 4/1995 | Donati . |
| 5,452,956 | 9/1995 | Gilliam . |

FOREIGN PATENT DOCUMENTS

2681354 * 3/1993 (FR) .

* cited by examiner

Primary Examiner—Joseph W. Drodge
Assistant Examiner—Terry K. Cecil
(74) Attorney, Agent, or Firm—Jacobson Holman, PLLC

(57) ABSTRACT

A system for recycling waste water from showers, bath tubs and lavatories to provide flush water for toilets and urinals. The system includes a receiving tank A, an overflow conduit 4, a make-up water conduit 16, a pump B, and a hydro-pneumatic tank C. The system ensures that a sufficient supply of flush water is available at a required pressure to meet the toilet flushing demand. Preferably, the distribution piping for the recycled waste water is of a different size or color in order to in order to avoid accidentally connecting the non-potable flush water supply to a potable use. Mechanisms are also provided so that the flush water can be scented, colored, filtered, or disinfected.

12 Claims, 2 Drawing Sheets

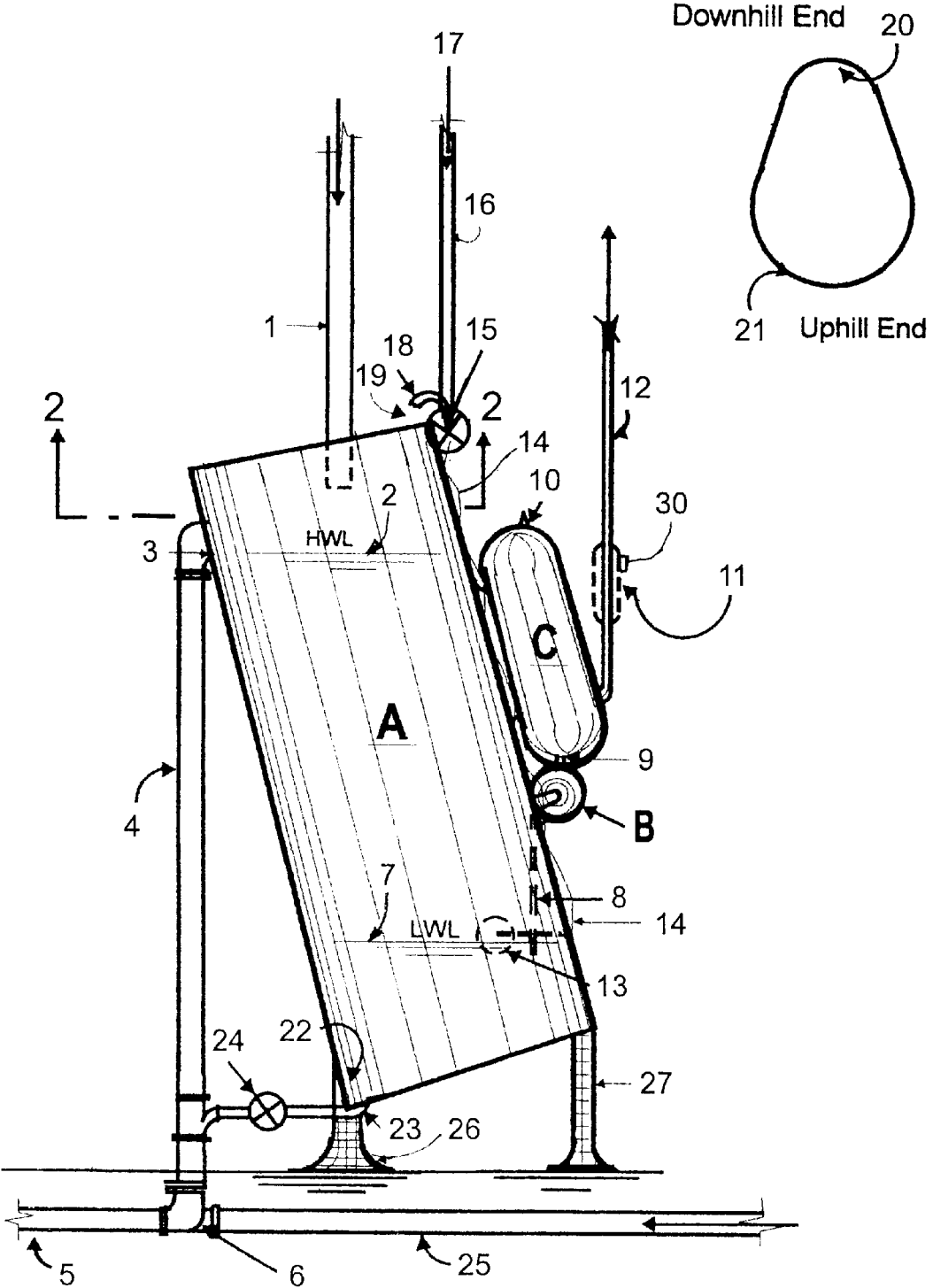

RESIDENTIAL WASTE WATER RECYCLING SYSTEM

FIELD OF THE INVENTION

The present invention relates to the field of recycling waste water from the shower, bath and lavatory of a home by conveying the waste water to a receiving tank connected to the toilets of the house for supplying recycled waste water to the toilets to substantially meet the water requirements for toilet flushing.

BACKGROUND OF THE INVENTION

Studies of all residential water consumption uses suggest that approximately 40% of the total potable water supplied to a residential household is used for toilet flushing. Another 40% is used for bathing. Only ten percent has any real public health need of meeting potability quality criteria (i.e., used for direct drinking, food preparation, and food preparation materials washing).

The unique coincidence of these two magnitudes suggests that bathing water might well be adequate to serve the toilet flushing function, with no need of its retaining potable qualities. In addition, unlike kitchen waste water (which contains food residues, oils, etc.), or laundry waste water (which contains fabric lint and other particulates), bath water is only likely to contain small amounts of soap wastes and perhaps minor amounts of body oils. The same observation can be made of waste water from lavatories. By limiting the waste water to be recycled for toilet flushing purposes to only these two sources, their combined volumes approximate the amount of water volume needed to provide all toilet flushing quantities needed to supply the toilet flushing demands of the same number of household residents as generate the bath water and lavatory waste water volumes.

Concepts for reuse of sub-potable water have been extensively reported in the literature. Among them, systems involving residential recycling, generally referred to as "gray" water systems, make use of those portions of residential waste water which do not contain waste streams containing human body wastes (so-called "black" water). "Gray" water has been recycled for reuse for a variety of purposes for which potability is not required (i.e., lawn watering, car washing, etc.), but in all such applications, the "gray" water does not re-enter the building.

In the mixture of "gray" water, in addition to waste water from showers, lavatories, and bath tubs, the waste streams from the kitchen contain food wastes collected in the kitchen sink, dish washer, and garbage disposal (if present), and waste streams from laundry trays and clothes washers containing lint and materials collected on the clothes being washed, plus waste water resulting from floor mopping containing miscellaneous particulates, have been included. All such foreign materials mitigate against reuse of gray water within the household.

Distribution of sub-potable water on a community wide basis has also been proposed, but has generally been rejected on the basis of cost of constructing a second water distribution system. Also, there is a perceived risk of the possibility of connection to the wrong water main when potable water use is required.

Concurrently, in response to a growing recognition of developing shortages in potable water supply systems, efforts have been launched to further minimize demand for potable water being supplied to residential buildings by imposing maximum flow rates on faucets and shower heads, and maximum permissible volume per flush on the sizing of flush tanks and flush valves on urinals and water is closets.

SUMMARY OF THE INVENTION

The present invention proposes to segregate the waste water from the bathroom fixtures which provide means for body washing alone, i.e., the lavatory, shower, and bath tub. This cleaner fraction of "gray" water contains nothing other than soap residues and perhaps some amount of body oils. All this waste stream originates in the bathrooms and will be recycled back to the bathrooms.

To assure the distinction between this selected fraction of "gray" water, and what has previously been done in efforts to recycle "gray" water, a new term for this fraction, "shobala" water (shower, bath, and lavatory) has been coined to assure no mistaking what is being recycled in the present invention from what may have been involved in previous residential water recycling efforts. The difference may very well identify all the things in previous "gray" water systems that mitigated against its being recycled within the residence.

The residential water recycler system of the present invention isolates specific sources of residential waste water possessing the most desirable properties of minimum pollution content and acceptable appearance, which. is available in sufficient quantity to achieve the specific purpose of supplying toilet flushing demand; acceptable in terms of appearance; and in an arrangement avoiding such public health risks of accidental cross-connections as have been identified in previous sub-potable water re-use concepts, together with means of improving acceptability of the quality of the delivered sub-potable recycled product water to effectively eliminate all demand for potable water to be used as flush water in urinals and water-closets in residential installations.

A principal health concern, in all piping systems involving the co-mingling in close proximity of non-potable flows with potable water distribution systems, has been avoidance of the risk of accidental cross-connection of a sub-potable fluid flow with one intended to provide potable water on demand. To obviate that concern, at least three features of the system of the present invention assure protection from accidental cross-connections: (1) the typical water distribution piping employed in single family residential construction uses ¾ inch pipe for the fresh water distribution system, the recycled toilet flushing supply uses ½ inch pipe; (2) the recycled water distribution piping system is of a different color from the fresh water distribution system; and (3) the only point at which fresh water is co-mingled with sub-potable water occurs in the waste water receiving tank where fresh water make-up is supplied across an air gap separation to assure no back-siphoning opportunity for the sub-potable supply to enter the fresh water system.

The residential water recycler system of the present invention consists of an assembly of a "shobala" water receiving tank supplied with waste water drained from tubs, showers, and lavatories (only) by segregated conduit means; a recycling pump and hydro-pneumatic tank to pump water from the receiving tank and deliver it under pressure to the flush water intake connections to toilet flush tanks or directly to pressure operated flush valves by conduit means; and ancillary to those basic components, may be equipped with a make-up water supply from the fresh water distribution system by conduit means to assure availability of flushing water at such times when the concurrence of daily accumulation of toilet flushing demands may exceed the amount of waste water received and stored during those far more time-specific discrete periods when showering and bathing occurs (generally evenings or mornings). An additional optional component consists of adding a pressurized chamber in the flush water return line from the system to permit installing any of a variety of filters and/or chemical additives to the flush water en route to the flushing supply to the toilet fixtures for the purpose of disinfection, deodorizing, and/or toilet bowl cleaning to make the recycled water both more acceptable to the user and to further add a colorant to the recycled water to further assure its not being mistaken for potable water by members of the household.

As described herein below, "shobala" water from lavatories, tubs, and showers supplying the flow to the receiving tank to be recycled, is supplied by gravity flow occurring in drains from the selected fixtures. In building possessing cellars or having other space below the finished first floor level, gravity flow will be received by the unit when it is located below that first floor level. In instances where location of the unit must be at the same level as the lowest floor having tub and shower fixtures (as in a slab-on-grade residential building), drains supplying "shobala" water to be recycled may be discharged into a sump from which a sump pump must be used to raise the drainage received to the height needed to supply the receiving tank.

Ancillary to performing the functional sequence of operations described in the operating cycle, a need also exists to provide for discharging amounts of "shobala" water received from tubs, showers, and lavatories that may exceed the storage capacity of the receiving tank before subsequent toilet flushing demands can consume it. An overflow outlet, above the high water level of the storage tank storage capacity, directly connected to the house main drain system via a conduit, discharges excess "shobala" water received directly to the sewer conduit, via a sewer line connection, in the same manner as the waste water would have gone had it not been diverted from the drain, waste, and vent system for possible toilet flushing use.

In addition, means are provided for supplying a shortfall in toilet flushing supply, should toilet flushing demand exceed the "shobala" water volume stored during bathing hours, by supplementing the stored "shobala" water with fresh water supplied from the domestic fresh water supply system via a conduit but only to the extent needed to assure toilet flushing demands being met, should they occur when stored "shobala" water is not available This auxiliary supply is available for use until the next recharge of "shobala" water is received in the receiving tank. This ancillary system is described for doing this automatically.

However, any shortfall in available "shobala" water in storage for a flushing demand will result in loss of pressure in the sub-potable supply lines from the hydro-pneumatic tank to the toilets. Should that happen, the toilet will not flush. The occupants of the building will have learned they need to open a faucet in the bath tub (or lavatory) and wait until sufficient flush water accumulates in the receiving tank to trigger the pump to feed the hydro-pneumatic tank to restore pressure. Simply turning on the bathtub or lavatory faucets until the water level in the receiving tank rises far enough above the tank low water level to cause a float switch in the receiving tank to turn a pump on again renews the flush water supply to the toilet fixture. Providing the make-up supply at the receiving tank can be seen as a convenience feature rather than essential to the ability of the basic system to effect the benefits of water demand reduction.

An additional optional feature includes means to install a replaceable filter cartridge in the conduit line from the hydro-pneumatic tank to the toilet fixtures. This unit not only permits filtration of the recycled water but also permits introducing disinfectants, toilet bowl cleansers, and coloration or scenting to the flush water to make it more visually and/or aromatically acceptable. It further assures visual recognition of the difference between the flush water and potable water being circulated in the residence.

Finally, it is to be anticipated that over a period of continuous use, some amount of settleable solids will be carried to the receiving tank by the "shobala" water being collected. The shaping of the tank, and its off-axis tilt, combine to assure rapid collection of such sediments in the lower bottom side of the tilted tank by use of the "tube settler" principle. That sediment collection sump is fitted with a valve permitting the sump to be drained into another connection, via a conduit means, to the main sanitary drain from the house to the sewer, thereby permitting flushing out the sediments with the minimum consumption of waste water stored in the tank being needed for clean-out purposes. After only a brief flush, the valve can be closed again.

Accordingly, it is an object of the present invention to provide a waste water recycling system.

It is another object of the present invention to provide a waste watering recycling system which limits the use of waste water to waste water originating from a shower, bath or lavatory of a residence for use in supplying flushing water to a toilet.

It is still yet another object of the present invention to provide a waste watering recycling system which limits the use of waste water to waste water originating from a shower, bath or lavatory of a residence for use in supplying flushing water to a toilet by a second water distribution system separate from a potable water distribution system of a household.

It is still a further object of the present invention to provide a waste watering recycling system which limits the use of waste water to waste water originating from a shower, bath or lavatory of a residence for use in supplying flushing water to a toilet by a second water distribution system separate from a potable water distribution system of a household with safeguards being built into the waste water distribution system, including different size pipes, different color pipes, different color water, deodorized water, the addition of disinfectant to the water, the addition of toilet bowl cleaning solutions and the only point at which potable water is in communication with waste water occurs in a waste water receiving tank where potable water makeup is supplied across an air gap separation to ensure no mixing opportunity for the waste water to enter the potable water supply system.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 illustrates an embodiment of the invention which includes the ancillary systems described.

FIG. 2 is a cross sectional view taken along line 2—2 in FIG. 1.

DETAILED DESCRIPTION OF THE PREFERRED EMBODIMENTS

Figure 3:
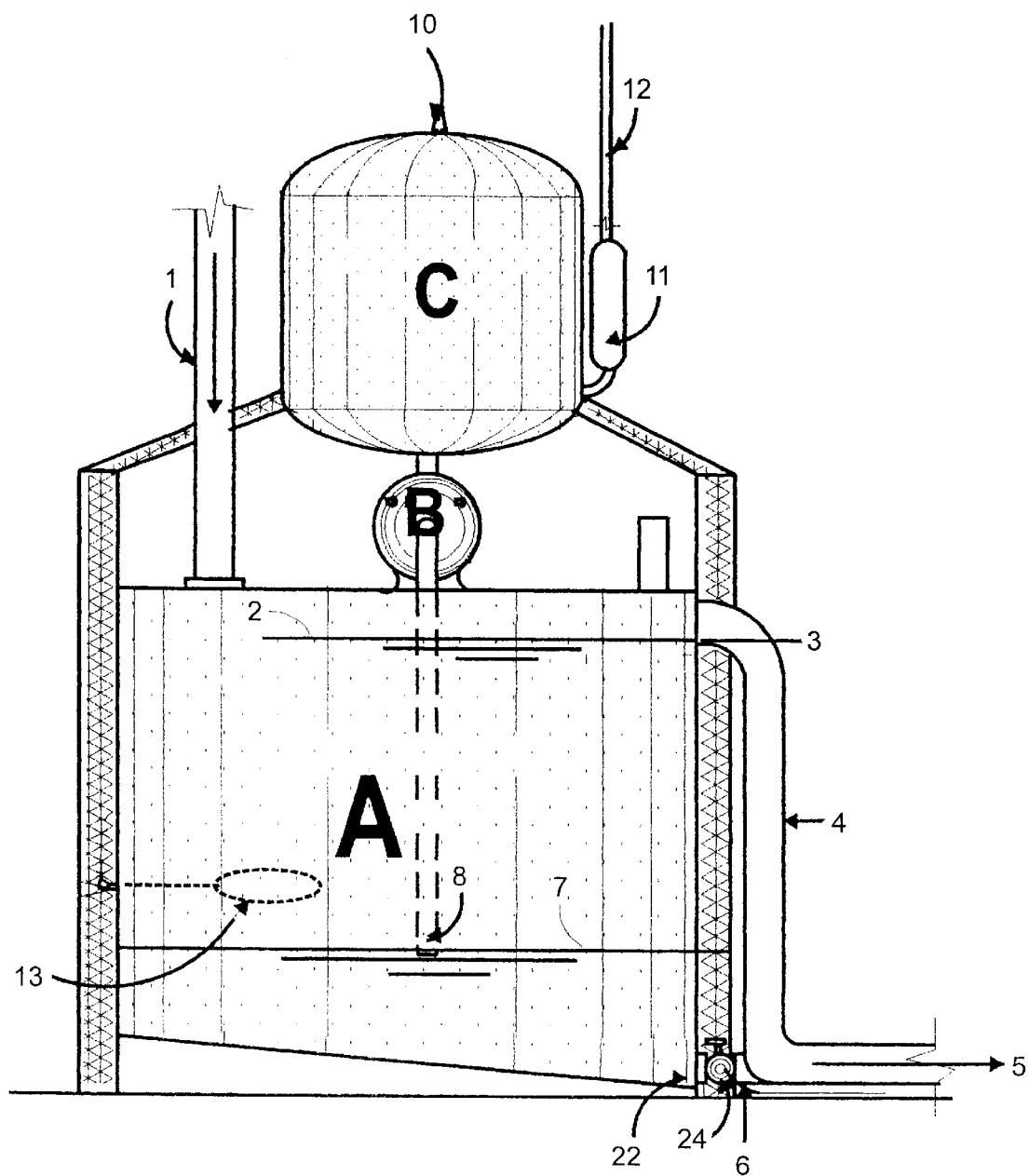
FIG. 3 is a sectional view of an alternate embodiment of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Accordingly, with reference to FIG. 1, a preferred embodiment of the present invention is illustrated comprised of a receiving tank "A" capable of receiving the isolated "shobala" waste water collected from the bath tubs, showers, and lavatories in a residence as they are produced, with sufficient storage volume capacity to store a quantity of waste water until needed to substantially supply all the toilet flushing volumes required in the course of a day as those flushing demands occur, a pump "B" and hydro-pneumatic tank "C" with the capacity to remove waste water collected in tank "A", and pressurize it sufficiently to deliver it on demand to the flush tanks of the water closets in the residence in response to the opening of float controlled inlet valves of the flush tanks of the water closets, or the operation of pressure flush valves on toilet fixtures so equipped.

The waste water receiving tank "A" receives the "shobala" waste water drained from tubs, showers, and lavatories via "shobala" drain pipe 1. Tank "A" is canted to facilitate settlement of suspended solids, and has an oval cross section with a narrow end 20 of the oval being on the low side of the cant (see FIG. 2). This shape and cant maximize the speed of settlement in accordance with the "tube settler" principle, and collect suspended solids in sump 22 at the low side of the bottom of tank A.

Tank A is fitted with a high water overflow outlet 3 located at high water line 2, connected by a conduit 4 to the house sanitary drain 5 continuing from main drain 25 at connection 6, to permit discharge of excess "shobala" waste water received in the same manner it would have been discharged if it had not been diverted to the receiving tank A. Sump 22 is fitted with an outlet conduit 23 and clean-out valve 24, also connected by conduit 4 to the house sanitary drain 5. Opening valve 24 permits collected sediments from sump 22 to be flushed out via drain conduit 4 to main sanitary drain 5.

Recycling supply water pump B is attached to a side of receiving tank A and is supplied by intake conduit 8 whose inlet is set just below intended low water level 7 in tank A. An outlet conduit from pump B supplies water to hydro-pneumatic tank C, which controls pump B by a pressure sensing switch 9. When the pressure in tank C drops below a preset minimum pressure, pump B is switched on, and when the pressure in tank C reaches an intended maximum operating pressure for domestic plumbing systems (generally 50 psig), pump B is turned off. (This is the same mechanism commonly employed to control the pressure in hydro-pneumatic tanks in general domestic water supply service.) Tank C is also equipped with a high-pressure relief valve 10 as a safety device to protect from occurrence of accidental over-pressure. Outlet conduit 12 from hydro-pneumatic tank C, which supplies flush water to the toilets, is deliberately chosen to be ½-inch diameter (noticeably smaller than the conventional ¾-inch size commonly used for the potable water distribution piping in residential pumping systems).

Auxiliary chamber 11 (shown in dotted lines) is shown as the location where filter, chlorination, and/or deodorizing or cleansing additives may be introduced to the flush water return line. In addition, the flush water supply may be deliberately colored a contrasting color from the potable water supply system. Such flush water supply treatment materials may be inserted in compartment 11 to affect all toilet bowls connected to the sub-potable flush water system.

Compartment 11 has an operable opening 30 to permit replenishment of the desired materials from time to time as they are consumed in operation. The opening is pressure tight when closed. These differences imparted to the waste water further assure no accidental connection of the sub-potable flushing water supply system to a device in the residence intended to receive a potable water supply by providing a visual warning that the water in the toilet bowl is not intended to be ingested.

An automatic ancillary make-up water supply system has also been included in the system illustrated in FIG. 1. Makeup water from the fresh water supply system of the house is supplied via conduit 16 in the direction of arrow 17 to the entrance to solenoid operated valve 15. Conduit 16 has a ¾ inch diameter to signify potable, fresh water. Float switch 13 is located in tank A at the intended low water level 7 of the tank, just above the inlet of conduit 8.

The outlet of valve 15 via conduit 18 is located above the lip of tank A to assure preservation of an air gap 19 between the outlet of conduit 18 and the high water level 2 of the water in tank A, even during occurrence of an overflow from tank A during a sewer back up of the house main sanitary drain 5. (Maintenance of the air gap during an overflow event is further assured by the cant angle to tank A, which produces the overflow stream on the opposite side of the tank from the location of the make-up water inlet, and which further increases the minimum air gap 19.)

Solenoid valve 15 opens in response to a low-water position of float switch 13 releasing make-up water across the air gap into receiving tank A. When the float switch rises sufficiently to indicate the availability of enough water volume in tank A to supply a minimum of two toilet bowl flushes, solenoid valve 15 closes. (The two flush minimum has been arbitrarily chosen to assure no need for the pump to continuously recycle on and off with each toilet bowl flush to avoid excessive wear on the pump and excessive noise disturbance each time it runs. The larger the capacity of the hydro-pneumatic tank A, the less frequent pump recycling will occur, but increased size of the unit requires additional space for its installation, and the cost of the unit. The size choice becomes a cost/benefit trade-off.)

Electrical supply wiring 14 is connected to the pump B and solenoid valve 15. The details of its installation, control, and function are well-understood in the art, and provision of their necessary safety details, particularly in wet exposures, is obligated by electrical codes prevalent in the area where an installation may be made.

Tank supports are also illustrated to hold the bottom of tank A above the plane of the floor on which it rests. Support legs 26 on the narrower end 20 of the tank A section, are shorter than support legs 27 on the wider side 21 of the tank A to further illustrate the cant direction of the longitudinal axis of tank A.

A second embodiment geometry has also been illustrated in FIG. 3. The axially canted "shobala" receiving tank A has been replaced by a tank with a vertical axis, with the bottom being hopper or funnel shaped to direct such settleable solids as may collect with usage to a location point for clean-out flushing convenience. All labels on components in FIG. 3 identify system components performing the same functions as those components bearing the same labels in FIG. 1. In this example, the improved settlement concentration provided by the canted axis of the embodiment illustrated in FIG. 1, has been traded off for what might represent increased fabrication simplicity and reduced gross floor space the unit occupies in an installation; again a cost-benefit trade-off.

In all these embodiments, protection from accidental cross-connection of recycled flush water distribution piping with the fresh water distribution piping within the building is effected by three different means: use of smaller size piping for the flush water distribution; use of a different color piping from the fresh water piping; and coloration of the flush water to distinguish it from the colorless potable water supply.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A non-potable flush water system for recycling domestic waste water to supply flush water for sanitary fixtures within at least one residential unit, said system comprising:
a drain, waste, and vent subsystem connectable to only baths, showers, and lavatories of all bathrooms in the at least one residential unit and drained to an oval-shaped receiving tank supplied with waste water drained from only bathing and lavatory plumbing fixtures installed in the bathrooms of the at least one residential unit, said tank having a narrow end and a wide end with the tank being equipped with a pump and an inlet pipe for transferring waste water to the tank and an outlet conduit for delivering the waste water at a required pressure as a sub-potable toilet flushing water supply to the sanitary fixtures in the at least one residential unit via visually recognizable different size and color conduits from that of a potable water supply distribution system in the at least one residential unit in response to a pressure sensing switch causing said pump to start and run until the pressure in the outlet conduit is restored to an intended maximum operating pressure to be maintained in a sub-potable flush water distribution piping and limited by a float switch in the receiving tank which shuts the pump off when liquid level in the tank falls below a predetermined level at which enough water remains in the tank above a pump inlet pipe to supply the water volume required to flush a connected sanitary fixture, said receiving tank being furnished with an overflow outlet at the narrow end of the tank permitting waste water received in excess of a predetermined storage capacity of the tank to be drained to a sanitary drainage system of the building, and said tank being fitted with an outlet sump at the narrow end of the tank near a bottom of the tank controlled by a valve to permit removal of sediments accumulated in the bottom of the tank to also be drained to the sanitary drainage system of the at least one residential unit, and an automatic low-water make up system comprised of a fresh water supply from a building potable water supply system connected by a conduit to a solenoid operated valve located at the wide end of the tank which discharges potable water via a supply conduit to an interior of the receiving tank across an air gap established between a maximum high water level to which liquid in the receiving tank can rise and an outlet of said conduit from the solenoid valve, said solenoid valve being operated by the float switch near the pump inlet pipe, connected to operate the solenoid valve.

2. The non-potable flush water system as described in claim 1, further comprising a hydro-pneumatic tank able to store and deliver a volume of sub-potable flushing water adequate to supply the demand of a predetermined number of toilet flushes at an intended operating pressure of the sub-potable flush water distribution piping, said hydro-pneumatic tank being supplied directly from the pump drawing water from said receiving tank, said hydro-pneumatic tank supplying the sub-potable flush water distribution piping by a conduit, and said hydro-pneumatic tank being equipped with a pressure sensing switch causing the pump to cycle on when the contained pressure in the hydro-pneumatic tank drops below a preset minimum, and off when an intended maximum pressure has been attained, and when in addition, a low water level in the receiving tank is below the level causing the float switch to turn the pump off.

3. The non-potable flush water system as described in claim 1, wherein an auxiliary chamber is located in the outlet conduit supply for supplying pressurized recycled waste water to the sanitary fixtures, said chamber permitting at least one of a filter, disinfectant, coloring and scent to be installed to process the recycled sub-potable water en route therethrough to the sanitary fixtures to permit delivery of the recycled water in at least one of a filtered, disinfectant treated, colored and scented form, to make the recycled water more acceptable to users of the sanitary fixtures, said chamber being equipped to permit opening the chamber to replace or replenish the at least one of filtering, scenting, coloring and disinfecting media therein as consumed, and permit reclosure in a pressure tight form.

4. The non-potable flush water system as described in claim 1, wherein the receiving tank storing the sub-potable flushing supply waste water receives combined output waste water from baths, showers, and lavatories contained within a plurality of residential units and is connected to all the toilets and urinals contained within said plurality of residential units to permit a single recycling unit to be installed to supply all the residential units in the group and to be supplied with suitable residential waste water received from all the residential units to be recycled for toilet flushing purposes, such combined system to be located within or among the group of residential units to permit conjoined support of the operating and maintenance of the system by the participating users, and with differences in pipe size and pipe color and a difference in flush water color serving to assure avoidance of a risk of accidental cross-connection of the sub-potable flushing water supply with the potable water distribution system.

5. A non-potable flush water system for recycling waste water to supply flush water for toilets, said system comprising:
a waste water receiving tank having a narrow end and a wide end, said receiving tank being positioned so that said narrow end is located closer to the ground than said wide end,
a waste water conduit conveying waste water into said receiving tank,
an intake conduit for drawing waste water from said receiving tank,
a hydro-pneumatic tank for pressurizing a predetermined quantity of waste water,
a pump for drawing water into said intake conduit and conveying the waste water to said hydro-pneumatic tank,
an outlet conduit in communication with said hydro-pneumatic tank for conveying waste water to a waste water distribution system, a make-up water conduit communicating with said receiving tank for conveying potable water to said receiving tank when a water level in said receiving tank falls below a predetermined level, a diameter of said outlet conduit being different from a diameter of said make-up water conduit, a high water overflow outlet located at said narrow end of said tank and being in communication with said receiving tank for conveying excess water in said receiving tank to a sewer drain, and a conduit connected to said make-up water conduit being located at said wide end of said tank and being spaced by an air gap from said receiving tank for preventing back up of waste water in said receiving tank from reaching said make-up water conduit.

6. A non-potable flush water system as claimed in claim 5, wherein a color of said outlet conduit is different from a color of said make-up water conduit.

7. A non-potable flush water system as claimed in claim 5, wherein an auxiliary chamber is located on said outlet conduit for treating waste water passing through said outlet conduit.

8. A non-potable flush water system as claimed in claim 7, wherein a source of water colorant is located in said auxiliary chamber to be added to water passing through said outlet conduit.

9. A non-potable flush water system as claimed in claim 7, wherein a filter is located in said auxiliary chamber to filter the water passing through said outlet conduit.

10. A non-potable flush water system as claimed in claim 7, wherein a source of a scented form is located in said auxiliary chamber to be added to the water passing through said outlet conduit.

11. A system for protecting integrated circuit wafers during storage and shipment, comprising:

a) a container having an interior an interior space for receiving the wafers;

b) first and second cushions positioned inside of hte interior space so as to receive the wafers therebetween;

c) each of the first and second cushions comprising compressible and resilient foam;

d) the first and second cushions comprising a dissipative path for electrical charges;

e) a grounding conductor in contact with a portion of the dissipative path of at least one of the first and second cushions and extending to an exterior of the container.

12. A non-potable flush water system as claimed in claim 5, wherein a longitudinal axis of said receiving tank is tilted at an angle to vertical.

* * * * *